US012779782B2

(12) United States Patent
Baggen et al.

(10) Patent No.: US 12,779,782 B2
(45) Date of Patent: Nov. 3, 2026

(54) DIRECT PRINT EXTRUDER WITH A MULTI-FACETED ADJUSTABLE OUTPUT PRESSURE

(71) Applicant: NIKE, Inc., Beaverton, OR (US)

(72) Inventors: Jared S. Baggen, Portland, OR (US); Gregory P. Dufour, Beaverton, OR (US); Sami M. Fakhouri, Portland, OR (US); Timothy J. Slama, Beaverton, OR (US); Marc D. Strauss, Tualatin, OR (US)

(73) Assignee: NIKE, Inc., Beaverton, OR (US)

( * ) Notice: Subject to any disclaimer, the term of this patent is extended or adjusted under 35 U.S.C. 154(b) by 167 days.

(21) Appl. No.: 18/665,348

(22) Filed: May 15, 2024

(65) Prior Publication Data

US 2024/0383202 A1 Nov. 21, 2024

Related U.S. Application Data

(60) Provisional application No. 63/466,926, filed on May 16, 2023.

(51) Int. Cl.

*B29C 64/321* (2017.01)
*B29C 48/92* (2019.01)
*B33Y 30/00* (2015.01)

(52) U.S. Cl.

CPC ............ *B29C 64/321* (2017.08); *B29C 48/92* (2019.02); *B29C 2948/92514* (2019.02); *B33Y 30/00* (2014.12)

(58) Field of Classification Search

CPC .......... B29C 48/92; B29C 2948/92514; B29C 2948/92019; B29C 2948/92571;

(Continued)

(56) References Cited

U.S. PATENT DOCUMENTS

2004/0080065 A1* 4/2004 Kim .................... B29C 44/3446 425/561
2012/0193825 A1* 8/2012 Hyun ...................... B29C 45/50 264/40.7

(Continued)

FOREIGN PATENT DOCUMENTS

DE 102016213439 A1 1/2018
EP 3656531 A1 5/2020

(Continued)

OTHER PUBLICATIONS

International Search Report and Written Opinion received for PCT Patent Application No. PCT/US2024/029734, mailed on Sep. 9, 2024, 13 pages.

*Primary Examiner* — Galen H Hauth
*Assistant Examiner* — Mohamed K Ahmed Ali
(74) *Attorney, Agent, or Firm* — Shook, Hardy & Bacon L.L.P.

(57) ABSTRACT

At a high level, aspects herein are directed to an extruder having an adjustable pressure output. The extruder comprises a frame and a barrel having an internal cylindrical volume that has a first longitudinal axis extending between a first end and a second end. The barrel is coupled to the frame. The extruder also includes a screw within the barrel internal cylindrical volume. The screw has a distal end and a proximal end, and is rotationally movable within the internal cylindrical volume and linearly moveable within the internal cylindrical volume. The screw distal end is linearly moveable at least 1 mm relative to the barrel end having a nozzle. The extruder further includes a linear drive coupled with the frame. The linear drive is coupled with the screw and provides linear movement coaxial with the first longitudinal axis to linearly move the screw.

15 Claims, 5 Drawing Sheets

(58) Field of Classification Search
CPC . B29C 2948/926; B29C 48/02; B29C 48/266; B29C 2948/92904; B29C 64/321; B29C 64/106; B29C 64/209; B29C 64/118
See application file for complete search history.

(56) References Cited

U.S. PATENT DOCUMENTS

| | | | | |
|---|---|---|---|---|
| 2013/0285279 | A1* | 10/2013 | Alsewailem | B29C 48/67 366/245 |
| 2018/0229435 | A1* | 8/2018 | Tyler | B29C 64/291 |
| 2019/0263061 | A1 | 8/2019 | Gress et al. | |

FOREIGN PATENT DOCUMENTS

| | | | | |
|---|---|---|---|---|
| WO | 2019/141606 | A1 | 7/2019 | |
| WO | WO-2022232888 | A1 * | 11/2022 | B33Y 30/00 |
| WO | 2022/260512 | A1 | 12/2022 | |

* cited by examiner

DIRECT PRINT EXTRUDER WITH A MULTI-FACETED ADJUSTABLE OUTPUT PRESSURE

CROSS-REFERENCE TO RELATED APPLICATIONS

This non-provisional patent application claims priority benefit of U.S. provisional application No. 63/466,926, filed May 16, 2023, and entitled DIRECT PRINT EXTRUDER WITH A MULTI-FACETED ADJUSTABLE BARREL PRESSURE the contents of which are incorporated herein by reference in the entirety.

TECHNICAL FIELD

Aspects herein relate to a direct print extruder capable of high frequency start and stop extrusion operations through an adjustable output pressure. More specifically, aspects herein relate to an extruder capable of macro pressure (e.g., low-frequency) adjustments based on screw rotation and micro (e.g., high-frequency) adjustments based on melt volume, such as through linear retraction of a screw within the barrel.

BACKGROUND

Typical extrusion printing of polymeric compositions deposit a consistent stream of material to develop a three dimensional feature. Extrusion printing is a form of additive manufacturing.

BRIEF DESCRIPTION OF THE DRAWINGS

Examples of the present invention are described in detail below with reference to the attached drawing figures, wherein.

DETAILED DESCRIPTION

Figure 1:
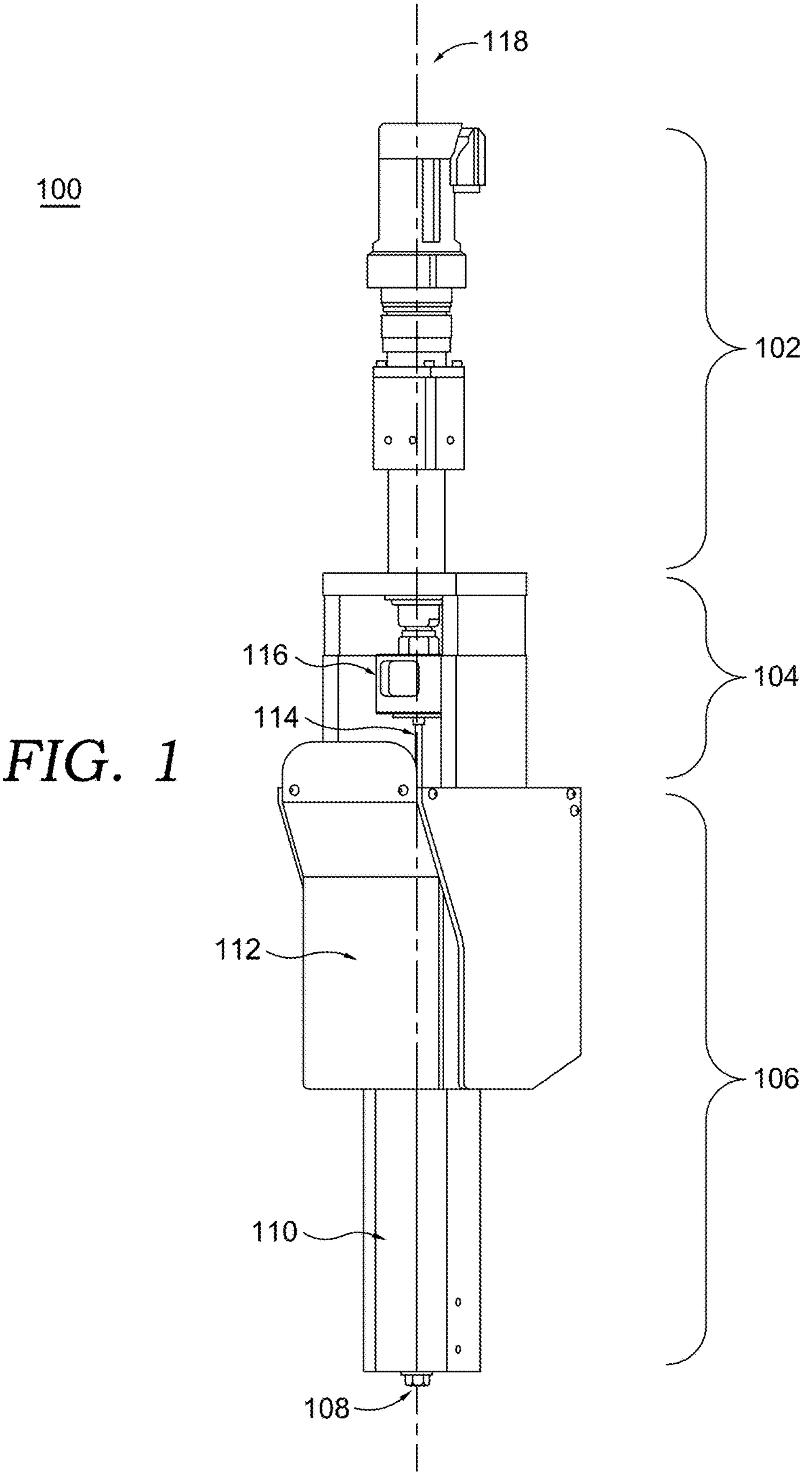
FIG. 1 illustrates an extruder in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms “step” and/or “block” might be used herein to connote different elements of methods employed, the terms should not be interpreted as implying any particular order among or between various steps herein disclosed unless and except when the order of individual steps is explicitly stated.

Extruders allow the deposition of material to form a three-dimensional (3D) object. An advantage of extruding a material is an ability to custom deposit materials to form bespoke structures with minimal tooling. For example, aspects contemplate extruding a material on a surface of a footwear sole portion (e.g., midsole) to form an outsole element. Because of the complex geometries, various sizes, and multiple styles associated with footwear, it is advantageous to 3D print a structure directly onto the article surface. The alternative is to generate the object through other means and then join the previously-formed object with the article surface. This process is inefficient and error prone. For example, variations in the footwear surface are known and therefore complicate joining the object with the surface. Additionally, alignment of the object and the footwear surface necessitates additional alignment and positioning steps to ensure quality standards are maintained. Additionally, bonding agents, such as primer and adhesives, are relied on to maintain a traditionally formed object on the surface of the footwear. Therefore, an ability to print an object directly on the footwear surface limits the additional steps and bonding agents to reduce production time and cost.

Further, traditional extrusion techniques have low-level control over the start and stop process of material deposition on a surface. Because of the characteristics of the extrusion process, such as extruding under pressure, and because of characteristics of the material being extruded (e.g., viscousness), the deposited material tends to extend beyond an intended stopping point for deposition. Some in the industry may refer to this as string, tails, and other terms relating to unintended deposition of material following the intended stopping location of deposition. In practice, the tails/strings are limited by having continuous depositions runs where there are minimal deposit stopping points on the surface receiving the deposition. Unfortunately, the limiting of deposit stopping points limits design options and can lead to increase material usage as a result of depositing material in areas of a surface not needed for the object, but deposited anyway to eliminate a deposition stopping point.

It is desired to have an extruder that is capable of high-frequency stopping and starting of material extrusion with limited unintended deposition of material at the stopping points. This high frequency (e.g., 2-20 stop cycles per second) start/stop cycle of extrusion allows for greater control of 3D formed objects at an industrial scale. A solution to achieve controlled material deposition at a stopping point is accomplished through varying of a pressure in an extruder barrel. In some examples, the pressure within the extruder barrel is adjusted through a change in volume available for the to-be extruded material (e.g., melt volume), as will be discussed in greater detail hereinafter.

At a high level, aspects herein are directed to an extruder having an adjustable pressure output. The extruder comprises a frame and a barrel having an internal cylindrical volume that has a first longitudinal axis extending between a first end and a second end. The barrel is coupled to the frame. The extruder also includes a screw within the barrel internal cylindrical volume. The screw has a distal end and a proximal end, and is rotationally movable within the internal cylindrical volume and linearly moveable within the internal cylindrical volume. The screw distal end is linearly moveable at least 1 mm relative to the barrel first end (at the nozzle). The extruder further includes a linear drive coupled with the frame. The linear drive is coupled with the screw and provides linear movement coaxial with the first longitudinal axis to linearly move the screw.

In some aspects, the extruder further comprises a drive motor having an output shaft. The drive motor is coupled to the frame, and the output shaft has a second longitudinal axis that is parallel to and offset from the first longitudinal axis. The drive motor is capable of causing rotational movement of the screw.

The extruder may also include a nozzle terminating the first end of the barrel and fluidly coupled with the internal cylindrical volume. The nozzle may have an internal surface forming a port allowing for fluid communication from within the internal cylinder volume to an external location.

The extruder may also include a connection assembly that is an intermediary coupling between the linear drive and the screw. The connection assembly may comprise a shaft coupled with the screw. The shaft has a screw end and a swivel end. The shaft may extend through the barrel second end toward the linear drive. The connection assembly may further comprise a kettle and a spherical bearing coupled with the kettle. The shaft swivel end is coupled with the spherical bearing and the kettle is coupled with the linear drive such that a linear force applied by the linear drive is translated through the kettle, the spherical bearing, and the shaft to the screw to linearly move the screw within the barrel. The connection assembly may also include a spherical bearing retention plate that is coupled with the kettle and secures the spherical bearing within a portion of the kettle. The spherical bearing isolates the linear drive from rotational movement transmitted from the screw to the shaft.

The extruder may also include a controller operably coupled with the linear drive and a drive motor. The controller is capable of instructing the linear drive to cause a linear movement of the screw to retract the screw end while also capable of instructing the drive motor to cease rotation of the screw. The controller may be capable of instructing the linear drive to retract the screw within the barrel at a termination of material extrusion and to extend the screw within the barrel at a start of material extrusion.

The present invention provides a method of controlling an extruder having an adjustable pressure output that enables precise deposition of material in a series of points in space. The method involves instructing a drive motor to rotate a screw in a first direction at a first rotational speed within a barrel of the extruder to cause a dispensing of material from a nozzle at a distal end of the barrel.

While dispensing the material, a multi-axis robot is instructed to follow a tool path at a first speed, wherein the tool path positions the nozzle at a series of points in space for the deposition of the material. Subsequent to dispensing the material, a linear drive is instructed to increase a volume of space within the barrel between the screw and the nozzle.

The increase of volume of space can be created by retracting a distal end of the screw from the nozzle, extending the nozzle away from a distal end of the screw, or opening a valve that connects an internal volume of the barrel with a secondary volume. In one aspect, the method further comprises instructing the drive motor to rotate the screw in a second direction within the barrel of the extruder.

Subsequent to instructing the linear drive to increase the volume of space, the method can further comprise instructing the linear drive to decrease the volume of space. Additionally, subsequent to instructing the linear drive to increase the volume of space, the method can further comprise instructing the multi-axis robot to move at a second speed that is slower than the first speed. Further, subsequent to instructing the linear drive to increase the volume of space, the method can comprise instructing the drive motor to rotate the screw in the first direction at a second rotational speed that is less than the first rotational speed.

The extruder and methods of use enable precise control of the extruded material with a high frequency start and stop of material extrusion/deposition and allows for the creation of complex geometries with high accuracy.

Accordingly, aspects herein are directed to an extruder having an adjustable pressure output. The extruder includes a frame. The extruder also includes a barrel having an internal cylindrical volume that has a first longitudinal axis extending between a first end and a second end. The barrel is coupled to the frame. The extruder also includes screw within the barrel internal cylindrical volume. The screw has a distal end and a proximal end. The screw is rotationally movable within the internal cylindrical volume and linearly moveable within the internal cylindrical volume such that the screw distal end is linearly moveable at least 1 mm relative to the barrel first end. The extruder also includes a linear drive coupled with the frame. The linear drive is coupled with the screw and provides linear movement coaxial with the first longitudinal axis to linearly move the screw.

In another aspect, an extruder having an adjustable pressure output is contemplated. The extruder comprises a frame and a barrel having an internal cylindrical volume that has a first longitudinal axis extending between a first end and a second end. The barrel is coupled to the frame. The extruder also includes a nozzle terminating the barrel first end and a screw within the barrel internal cylindrical volume. The screw has a distal end and a proximal end, wherein the screw is rotationally movable within the internal cylindrical volume. The extruder also includes a controller. The controller is capable of instructing a change in volume between the screw distal end and the nozzle at a start or a stop of material extrusion through the nozzle.

Turning now to FIG. 1 illustrating an extruder 100, in accordance with aspects hereof. The extruder 100 is a three-dimensional (3D) printing extruder. The extruder 100 includes a heating element capable of heat a material to be deposited to at least a glass transition temperature or higher (e.g., a melt temperature). The extruder 100 may be joined with a motorized carriage, such as a multi-axis robotic arm that moves in the X, Y, and Z directions to deposit the material and additively build an object. The extruder 100 is designed to work with a variety of different materials, such as polymer-based compositions. Examples of polymer-based compositions include, but are not limited to, ABS (acrylonitrile butadiene styrene), PLA (polylactic acid polymer), nylon, and PETG (polyethylene terephthalate glycol). The extruder 100 is capable of achieving an extrusion temperature of 500° C. in some situations.

The extruder 100 is comprised of a linear drive 102, a connection assembly 104, and an extruder portion 106.

The linear drive 102 is any drive mechanism that generates a linear force. For example, the linear drive 102, in an aspect, is a linear actuator comprised of an electric motor, a gear compilation, and a drive rod. In this example, the electric motor generates rotational energy through an output shaft. The output shaft engages with the gear compilation that reduces an rotational speed (e.g., angular velocity) and transfer the rotational energy to the drive rod for linear movement. The gear compilation may include a one or more screw drives that convert the rotational energy into linear movement. Another example of a drive mechanism that generates a linear force is a pneumatic and/or hydraulic actuator having a piston and cylinder configuration.

The linear drive 102 is effective, in an example, to create a linear travel range of 1 mm to 10 mm, or 1-5 mm, or 1-4 mm. The linear drive 102 is effective, in an example, to generate the liner travel range at a high frequency of 1-20 cycles per second, 1-10 cycles per second, or 1-10 cycles per second, or 1-5 cycles per second. The number of cycles per second provided by the linear drive 102 determines, in part, the number of start and stop cycles that can be achieved for an extrusion process. The start/stop cycle frequency, in some examples, controls a travel speed of the extruder over a surface onto which the extruded material is to be deposited. For example, the few start/stop cycles available per second causes the printed segment length to increase or reduces the travel speed of the extruder. In both examples, the output product may be limited by design and/or throughput volume.

The connection assembly 104 will be discussed in greater detail in FIGS. 2 and 3 hereinafter. The connection assembly 104 includes a kettle 116 and a shaft 114. The connection assembly 104 serves as a joining component between the linear drive 102 and a screw of the extruder portion 106. For example, the shaft 114 directly (or indirectly) joins with the extruder portion screw. The kettle directly (or indirectly) couples with the linear drive 102. The connection assembly 104 is effective to isolate rotation motion transferred from the screw via the shaft from the linear drive 102. As will be discussed in greater detail hereinafter, the kettle 116 may comprise a bearing or other rotational coupling. A spherical bearing is an example of a rotational coupling that provide securement in a linear direction while allowing free rotation about the axis of linear direction resistance.

The extruder portion 106 includes a barrel 110, a nozzle 108, and a component case 112. While not depicted in FIG. 1, the extruder portion 106 also include a screw, a drive motor, and a drivetrain. The drive motor is effective to generate rotational energy that is transferred to the screw via the drivetrain. The screw rotates within the barrel to act on the material to be extruded, such as polymer pellets and/or line. The screw assists in combining, manipulating, compressing, and/or shearing the material to be extruded in preparation for depositing from the barrel through the nozzle 108.

The extruder portion 106 may also include a controller for controlling one or more functions. The controller is a computing device. A computing device may include a bus that directly or indirectly couples the following devices: memory, one or more processors, one or more presentation components, input/output (I/O) ports, I/O components, and a power supply. Aspects hereof are contemplated as being performed in whole or in part on one or more components of a distributed computing system. It is contemplated that a distributed computing system may be comprised of processors, networks, and memory that scale to handle as desired level of computing processes at a time. Therefore, it is contemplated that a computing device may also refer to the computing environment of a distributed computing system that dynamically changes with time and/or demand.

Computing device typically includes a variety of computer-readable media. Computer-readable media can be any available media that can be accessed by a computing device and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory includes computer-storage media in the form of volatile and/or nonvolatile memory. The memory may be removable, nonremovable, or a combination thereof. Exemplary memory includes non-transitory, solid-state memory, hard drives, optical-disc drives, etc. Computing device includes one or more processors that read data from various entities such as a bus, a memory, and/or I/O components. Presentation component(s) present data indications to a person or other device. Exemplary presentation components include a display device, speaker, printing component, vibrating component, etc. I/O ports allow computing device to be logically coupled to other devices including I/O components, some of which may be built in.

The controller is operably coupled with one or more components (e.g., linear drive, drive motor, multi-axis robot, etc). An operable coupling may be wired or wireless. An operable coupling is effective to communicate instructions from the controller to a controlled element, and in some examples, receive information/instructions from the received element at the controller.

The extruder portion 106 may further comprise a heating element. The heating element may be integrated with the barrel, adjoining the barrel, and/or within the barrel. The heating element may be an electric heating element capable of heating a portion of the barrel and/or the screw to affect the material to-be extruded.

A longitudinal axis 118 is depicted extending along a longitudinal axis of the extruder 100. The longitudinal axis extends through a cross sectional center of the screw, the shaft 114, and an interior volume of the barrel, in an example. Each of these components in an example are coaxial. As will be discussed, the drive motor may have a longitudinal axis that is parallel, but offset from the longitudinal axis 118. The offset orientation of the drive motor, in an example, allows the rotational energy to be provided for the screw while allowing the shaft 114 to extend coaxially from the extruder portion 106 without mechanical interference from the drive motor.

The extruder 100 may be positioned and moved by any mechanism. In an example, it is contemplated that a multi-axis robotic arm, such as a 6-axis robotic arm is coupled with the extruder 100 such that the extruder 100 functions as an end-of-arm tool on the robotic arm. An X-Y table or other robotic configurations are also contemplated for positioning and moving the extruder 100.

In an example, it is contemplated that the controller is effective, through a logical coupling with the multi-axis robot, to position the nozzle 108 along a tool path for intentional deposition of material onto a surface, such as a midsole of a footwear article. The controller is effective to control the speed, position, and pathway of the robotic arm as it manipulates the extruder 100. Additional considerations of the robotic arm, the extruder 100, the controller, and other components will be addressed hereinafter.

Figure 2:
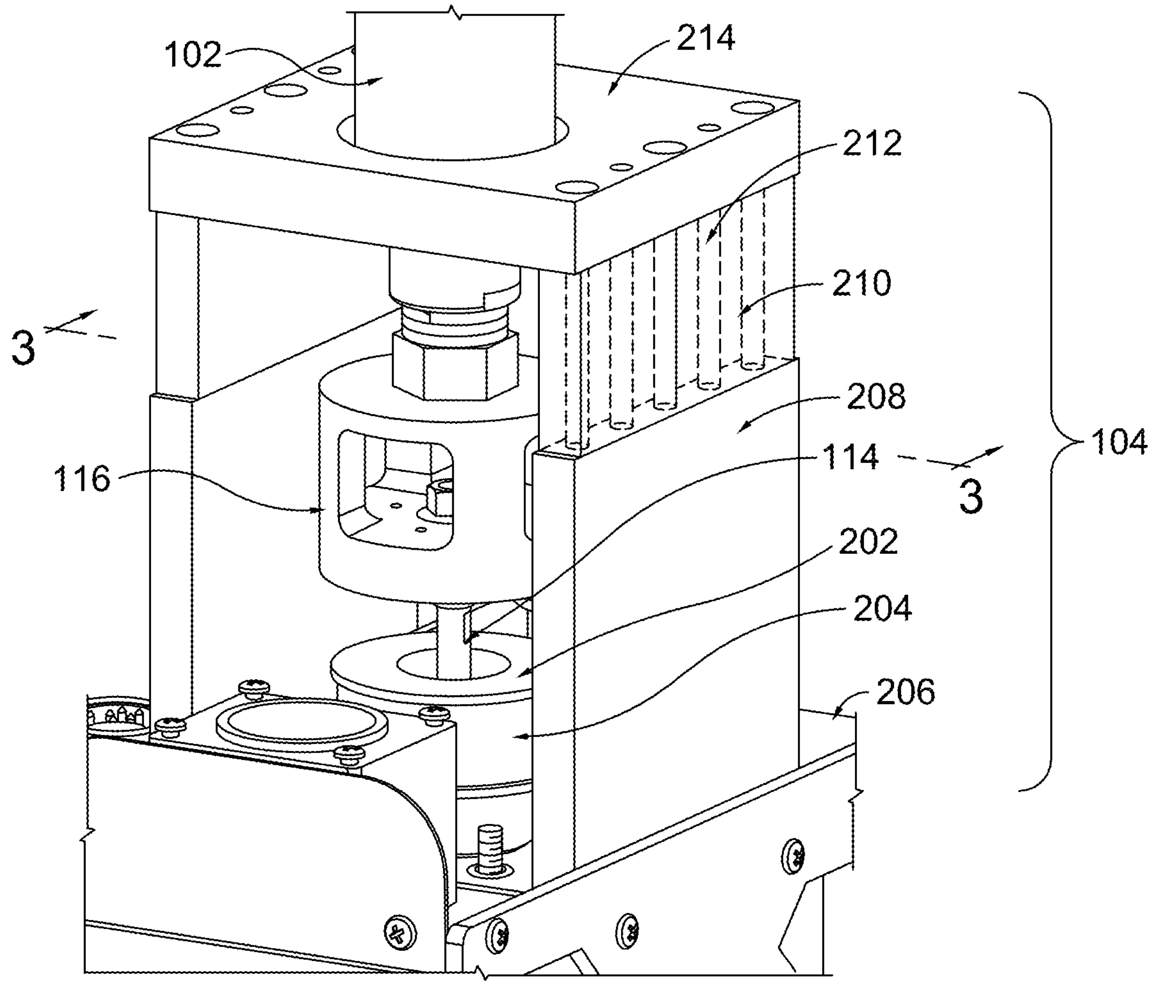
FIG. 2 illustrates a focused perspective of the connection assembly of the extruder from FIG. 1 in accordance with aspects herein.

Turning now to FIG. 2 illustrating a focused perspective of the connection assembly 104 of the extruder 100 from FIG. 1, in accordance with aspects hereof. The connection assembly 104 is comprised of the shaft 114, the kettle 116, a pulley 202, a belt 204, a frame 206, a chassis first plate 208, a chassis second plate 210, and a chassis top plate 214.

Figure 3:
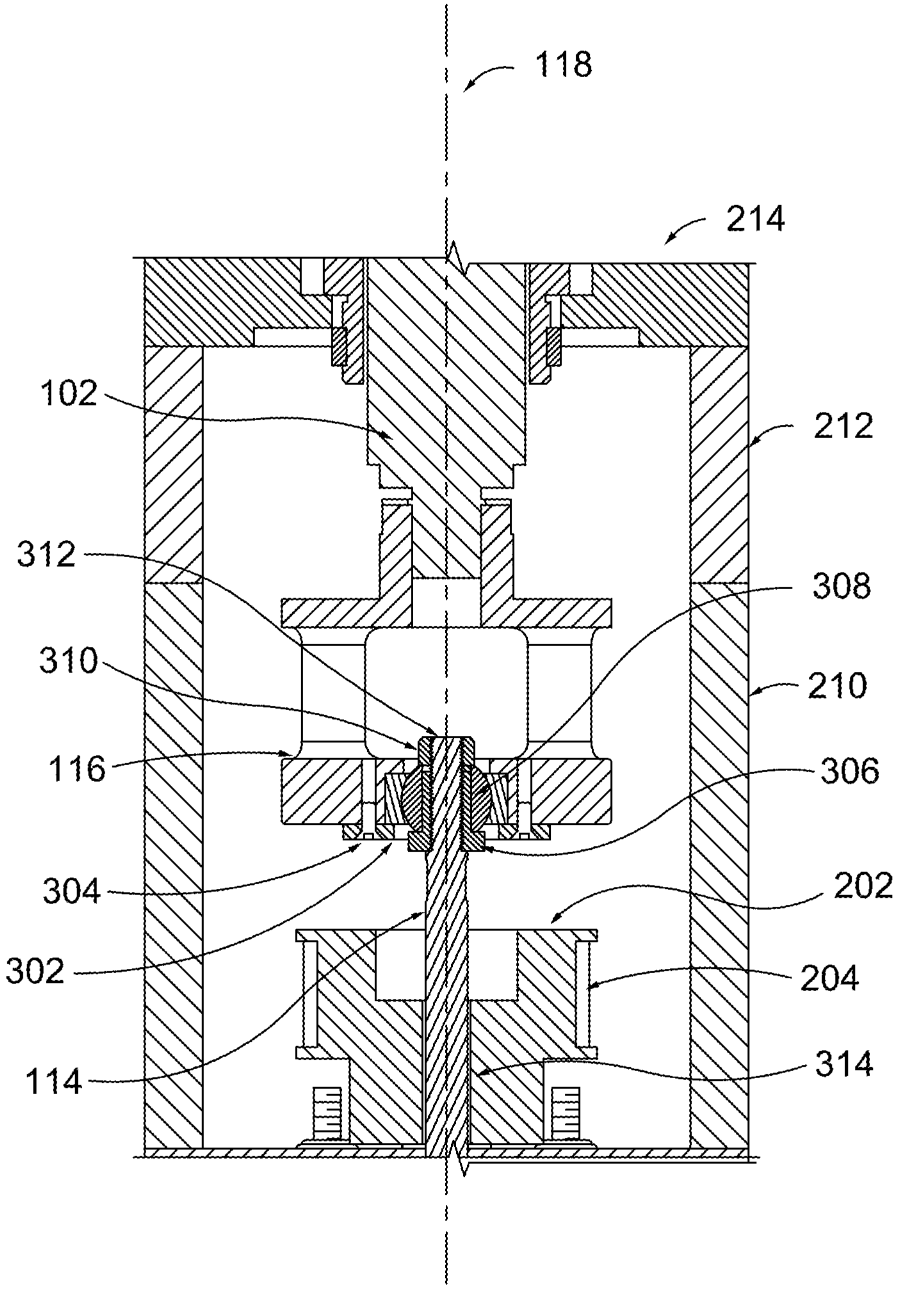
FIG. 3 illustrates a cross sectional view of the connection assembly along line 3-3 of FIG. 2 in accordance with aspects herein.

FIG. 3 depicts a cross sectional view of the connection assembly 104 along line 3-3 of FIG. 2, in accordance with aspects hereof. The connection assembly in FIG. 3 also depicts a retention plate 302, retention plate securement 304, a sleeve 306, a spherical bearing 308, a shaft lock 310, a shaft swivel end 312, and a pulley aperture 314 through which the shaft 114 extends.

FIGS. 2 and 3 viewed in combination provide an illustration of the connection assembly 104 and associated components that allow for the connection assembly to isolate rotational energy transmitted from the screw via the shaft 114 to be isolated from the linear drive 102. Specifically, the spherical bearing 308 is secured in the kettle 116 by the retention plate 302 and the retention plate securement 304. The securement ensure linear stability as linear force is applied by the linear drive 102 through the kettle 116 to the shaft 114 while allowing free rotation of the shaft 114. The rotation of the shaft 114, as controlled by the spherical bearing 308, is about the longitudinal axis 118.

The pulley 202 and the belt 204 are part of a drivetrain functionally coupling the screw with the drive motor to create rotational movement of the screw within the barrel. While not depicted, the pulley 202 extends around another pulley operatively coupled with an output shaft of the drive motor. In this configuration, the rotational energy provided by the drive motor may be transmitted through the drivetrain to the screw. The screw, in turn, transmits the rotational energy to the shaft extending through the pulley 202 via the pulley aperture 314, in this example. Stated differently, the primary transfer of rotational energy from the drive motor is from the pulley 202 to the screw and not relying on the shaft 114 to transfer the rotational energy from the pulley 202 to the screw. In this example, the rotational energy communicated via the shaft is incidental to the primary object of providing a conduit of linear movement from the linear drive 102 to the screw. Alternative drivetrains are contemplated, such as a geared drivetrain.

The frame 206 serves as a foundation for securing the extruder portion 106 with the connection assembly 104. The connection assembly 104 serves as a connecting pathway for the linear drive 102. The chassis portions, such as the chassis first plate 208, the chassis second plate 210, chassis joiner, 212, and the chassis top plate 214, provide a foundation for securing the various components of the connection assembly 104 and the linear drive 102. In this example the chassis first plate 208 and the chassis second plate 210 are separable from each other to facilitate maintenance, adjustment, and other service features to the connection assembly 104. The chassis first plate 208 is coupled with the frame 206.

Figure 4:
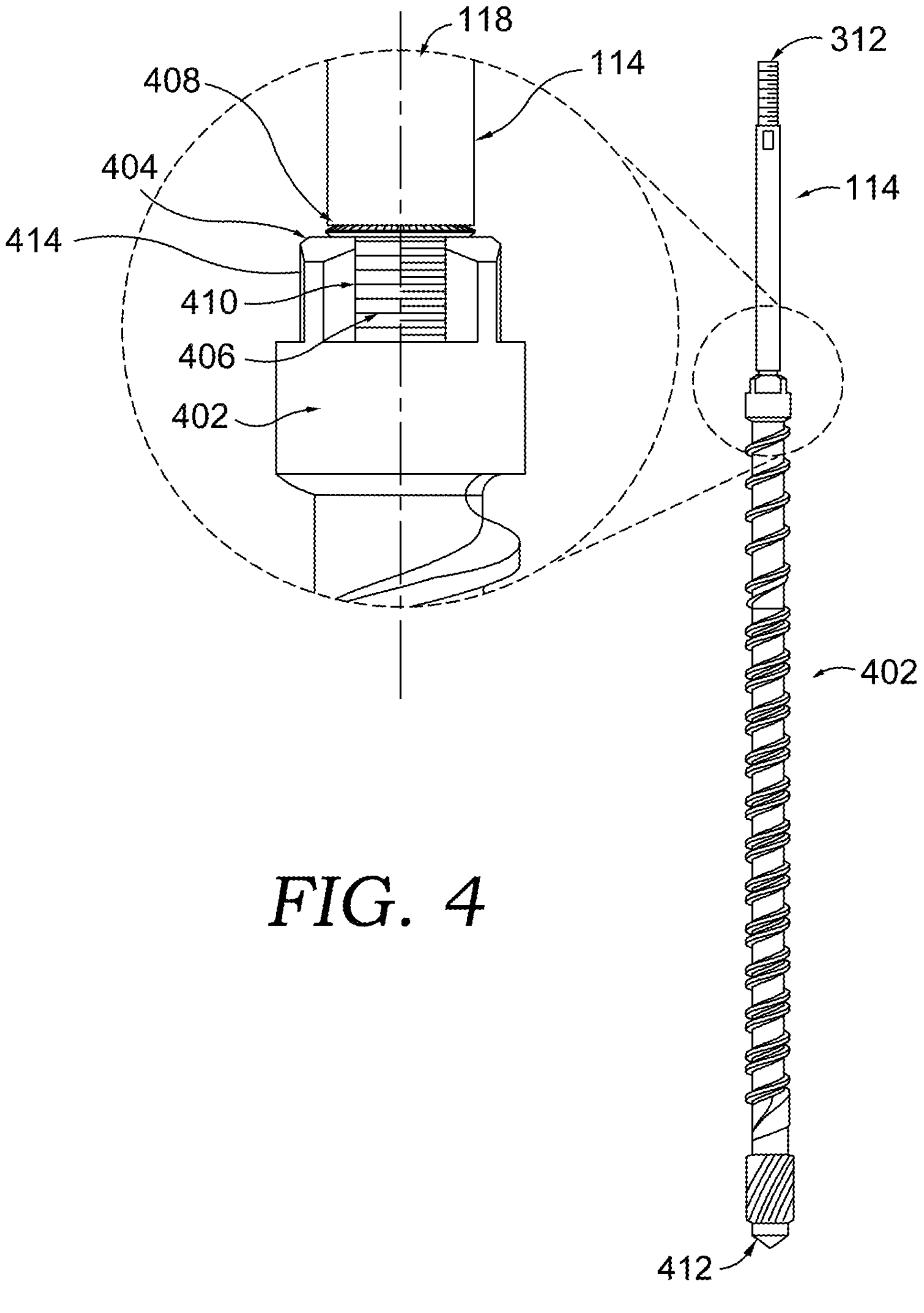
FIG. 4 illustrates the screw coupled with the shaft of FIG. 3 in accordance with aspects herein.

FIG. 4 illustrates a screw 402 coupled with the shaft 114 in accordance with aspects hereof. A focused view is also provided of the interaction between the screw 402 and the shaft 114. The screw 402 has a screw distal end 412 and a screw proximal end 404 having a spline 414. The screw distal end 412 is positioned proximate the nozzle 108 of FIG. 1 when included within the barrel. The screw proximal end 404 includes a bore 406 internally positioned on the screw 402 for receiving a distal end 410 of the shaft 114. It is contemplated that the bore 406 and the shaft distal end 410 may be complimentarily threaded to threadably join the shaft 114 with the screw 402. It is contemplated that the threading (e.g., right-hand thread or left-hand thread) may be selected to ensure a continued tightening of the junction during rotation of the screw during an extrusion processes. Stated differently, it is contemplated that the extrusion rotation is effective to tighten a threaded interaction between the screw 402 and the shaft 114. Further, in a contemplated aspect a set screw passes through the shaft at the screw proximal end 404 and towards the bore 406. The set screw is effective to limit the decoupling of the screw 402 from the shaft 114, in this example. An external surface of the screw 402 at the screw proximal end 404 has a planar surface forming the spline 414. The spline 414 is effective to provide an engaging surface for unthreading the screw 402 from the shaft 114 in aspects.

Figure 5:
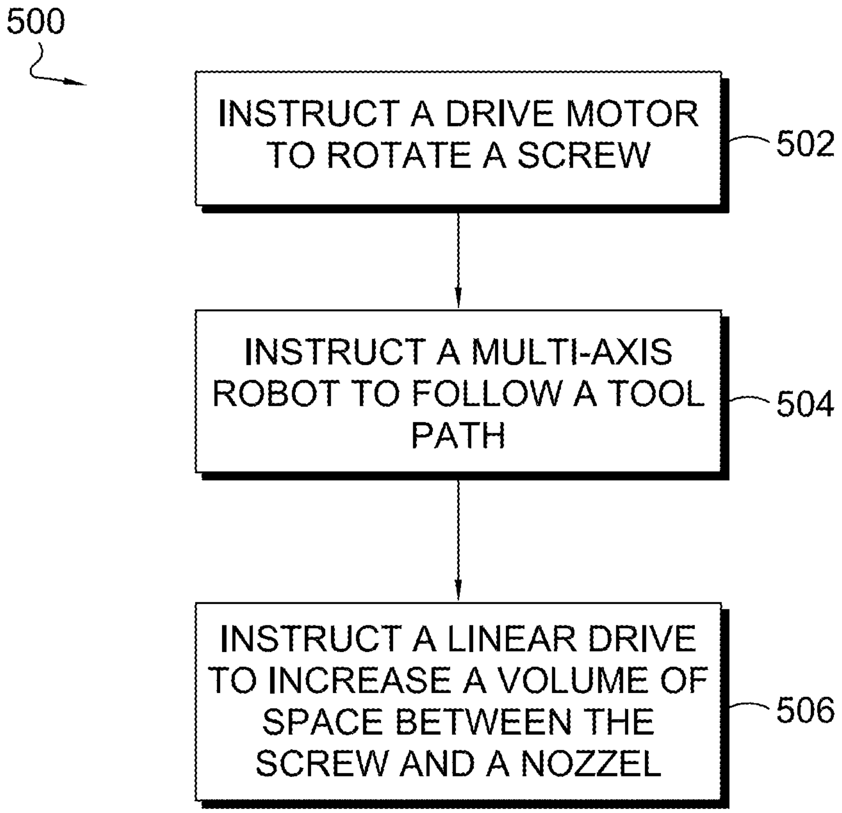
FIG. 5 illustrates a method of controlling an extruder having an adjustable pressure output, in accordance with aspects herein.

FIG. 5 illustrates a method 500 of controlling an extruder having an adjustable pressure output, in accordance with aspects hereof. At a block 502 the method 500 contemplates instructing a drive motor to rotate a screw in a first direction at a first rotational speed within a barrel of the extruder to cause a dispensing of material from a nozzle at a distal end of the barrel. The instruction may be communicated from a controller to the drive motor, such as through a wired connection. The first rotation speed (e.g., angular velocity) may be an appropriate speed (e.g., 30-80 RPM, 40-70 RPM, 55-65 RPM) for extruding the to-be-extruded material from the barrel.

At a block 504 the method 500 contemplates that while dispensing the material, instructing a multi-axis robot to follow a tool path at a first speed, wherein the tool path positions the nozzle at a series of points in space for the deposition of the material. For example the same controller proving the initial instruction to the drive motor may also provide instructions to the multi-axis robot to execute a motion plan that allows the nozzle to follow a deposition path along a surface of a footwear component. The first speed of movement may be any speed (e.g., 40-160 mm/sec, 60-140 mm/sec, 80-120 mm/sec, 90-110 mm/sec) effective to deposit the desired quantity of material at any given point on the surface.

At a block 506 the method 500 contemplates that subsequent to dispensing the material, instructing a linear drive to increase a volume of space within the barrel between the screw and the nozzle. Similar to the drive motor and the multi-axis robot, it is contemplated in an example that a common controller is effective to instruct the linear drive to increase the volume of space. The linear drive may retract the screw from the nozzle a defined distance, such as 1 mm-3 mm. This retraction creates a great barrel volume near the nozzle, which is effective to reduce the pressure within the barrel near the nozzle. By reducing the pressure, a flow (intentional or not) of the material out of the nozzle is reduced or prohibited. It is this flow reduction/prohibition that provides the ability to do high-frequency start/stop cycles with limited string/tails, as discussed previously. An alternative contemplation is the linear drive extends the nozzle away from the distal end of the screw. Again, the result is creation of a great volume within the barrel near the nozzle. Yet another contemplated aspect is the linear drive causes a valve to open from the barrel to another volume, which effectively creates a great volume of the barrel to reduce the pressure.

The following are contemplated aspects of the disclosed concept. It is understood that any combination of the following is contemplated within the scope of the application.

Clause 1. An extruder having an adjustable pressure output, the extruder comprising: a frame; a barrel having an internal cylindrical volume that has a first longitudinal axis extending between a first end and a second end, the barrel is coupled to the frame; a screw within the barrel internal cylindrical volume, the screw having a distal end and a proximal end, wherein the screw is rotationally movable within the internal cylindrical volume and linearly moveable within the internal cylindrical volume such that the screw distal end is linearly moveable at least 1 mm relative to the barrel first end; and a linear drive coupled with the frame, wherein the linear drive is coupled with the screw and provides linear movement coaxial with the first longitudinal axis to linearly move the screw.

Clause 2. The extruder of clause 1 further comprising a drive motor having an output shaft, the drive motor is coupled to the frame, wherein the output shaft has a second longitudinal axis that is parallel to and offset from the first longitudinal axis and the drive motor capable of causing rotational movement of the screw.

Clause 3. The extruder of any preceding clause further comprising a nozzle terminating the first end of the barrel and fluidly coupled with the internal cylindrical volume, wherein the nozzle has an internal surface forming a port.

Clause 4. The extruder of any preceding clause further comprising a connection assembly that is an intermediary coupling between the linear drive and the screw.

Clause 5. The extruder of any preceding clause 4, wherein the connection assembly comprises a shaft coupled with the screw, the shaft having a screw end and a swivel end.

Clause 6. The extruder of any preceding clause, wherein the shaft extends through the barrel second end toward the linear drive.

Clause 7. The extruder of any preceding clause, wherein the connection assembly further comprises a kettle and a spherical bearing coupled with the kettle, wherein the shaft swivel end is coupled with the spherical bearing and the kettle is coupled with the linear drive such that a linear force applied by the linear drive is translated through the kettle, the spherical bearing, and the shaft to the screw to linearly move the screw within the barrel.

Clause 8. The extruder of any preceding clause, wherein the connection assembly further comprises a spherical bearing retention plate that is coupled with the kettle and secures the spherical bearing within a portion of the kettle, wherein the spherical bearing isolates the linear drive from rotational movement transmitted from the screw to the shaft.

Clause 9. The extruder of any preceding clause, wherein the connection assembly is coupled with the frame and extends from a first side of the frame and the barrel extends from an opposite second side of the frame.

Clause 10. The extruder of any preceding clause further comprising a controller operably coupled with the linear drive and a drive motor, wherein the controller is capable of instructing the linear drive to cause a linear movement of the screw to retract the screw end while also capable of instructing the drive motor to cease rotation of the screw.

Clause 11. The extruder of any preceding clause, wherein the controller is capable of instructing the linear drive to retract the screw within the barrel at a termination of material extrusion and to extend the screw within the barrel at a start of material extrusion.

Clause 12. The extruder of any preceding clause, wherein the controller is operably coupled with a multi-axis robot and capable of instructing positioning of an end-of-arm tool associated with the multi-axis robot and instructing the linear drive in concert.

Clause 13. The extruder of any preceding clause further comprising a multi-axis robot having an arm, wherein the extruder is coupled with the arm to form an end-of-arm tool.

Clause 14. The extruder of any preceding clause, wherein the screw comprises a bore at the proximal end, the bore capable of receiving a screw end of a shaft.

Clause 15. The extruder of any preceding clause, wherein the bore comprises a right-hand thread or a left-hand thread for threadably coupling the shaft with the screw.

Clause 16. The extruder of any preceding clause, wherein the screw further comprises a set screw extending through the screw into the bore.

Clause 17. An extruder having an adjustable pressure output, the extruder comprising: a frame; a barrel having an internal cylindrical volume that has a first longitudinal axis extending between a first end and a second end, the barrel is coupled to the frame; a nozzle terminating the barrel first end; a screw within the barrel internal cylindrical volume, the screw having a distal end and a proximal end, wherein the screw is rotationally movable within the internal cylindrical volume; and a controller, wherein the controller is capable of instructing a change in volume between the screw distal end and the nozzle at a start or a stop of material extrusion through the nozzle.

Clause 18. The extruder of clause 17 further comprising a linear drive effective to adjust a position of the nozzle along the first longitudinal axis, wherein the controller is operably coupled with the linear drive and effective to instruct the linear drive to cause the change in volume.

Clause 19. The extruder of any preceding clause further comprising a linear drive effective to a position of the screw along the first longitudinal axis, wherein the controller is operably coupled with the linear drive and effective to instruct the linear drive to cause the change in volume.

Clause 20. The extruder of any preceding clause further comprising a shaft coaxially joined with the screw and coupled with the linear drive and capable of transferring linear force from the linear drive to the screw.

Clause 21. The extruder of any preceding clause further comprising a connection assembly positioned between the shaft and the linear drive, the connection assembly capable of isolating rotational motion of the shaft from the linear drive.

Clause 22. The extruder of any preceding clause, wherein the connection assembly comprises a spherical bearing, the spherical bearing is effective to join the shaft with the connection assembly such that rotational motion from the shaft is capable for rotating a first portion of the spherical bearing while a second portion of the spherical bearing remains rotationally fixed.

Clause 23. A method of controlling an extruder having an adjustable pressure output, the method comprising: instructing a drive motor to rotate a screw in a first direction at a first rotational speed within a barrel of the extruder to cause a dispensing of material from a nozzle at a distal end of the barrel; while dispensing the material, instructing a multi-axis robot to follow a tool path at a first speed, wherein the tool path positions the nozzle at a series of points in space for the deposition of the material; and subsequent to dispensing the material, instructing a linear drive to increase a volume of space within the barrel between the screw and the nozzle.

Clause 24. The method of clause 23, wherein the increase of volume of space is created by retracting a distal end of the screw from the nozzle.

Clause 25. The method of clause 23, wherein the increase of volume of space is created by extending the nozzle away from a distal end of the screw.

Clause 26. The method of clause 23, wherein the increase of volume of space is created by opening a valve that connects an internal volume of the barrel with a secondary volume.

Clause 27. The method of clause 23 further comprising instructing the drive motor to rotate the screw in a second direction within the barrel of the extruder.

Clause 28. The method of clause 23 further comprising, subsequent to instructing the linear drive to increase the volume of space, instructing the linear drive to decrease the volume of space.

Clause 29. The method of clause 23, further comprising, subsequent to instructing the linear drive to increase the volume of space, instructing the multi-axis robot to move at a second speed that is slower than the first speed.

Clause 30. The method of clause 23 further comprising, subsequent to instructing the linear drive to increase the volume of space, instructing the drive motor to rotate the screw in the first direction at a second rotational speed that is less than the first rotational speed.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the clauses. Not all steps listed in the various figures need be carried out in the specific order described.

What is claimed is:

1. An extruder having an adjustable pressure output, the extruder comprising:

a frame;

a barrel having an internal cylindrical volume that has a first longitudinal axis extending between a first end and a second end, the barrel is coupled to the frame;

a screw within the internal cylindrical volume of the barrel, the screw having a distal end and a proximal end, wherein the screw is rotationally movable within the internal cylindrical volume and linearly moveable within the internal cylindrical volume such that the distal end of the screw is linearly moveable at least 1 mm relative to the first end of the barrel;

a linear drive coupled with the frame, wherein the linear drive is coupled with the screw and provides linear movement coaxial with the first longitudinal axis to linearly move the screw; and a connection assembly that is an intermediary coupling between the linear drive and the screw, wherein the connection assembly comprises a shaft coupled with the screw, a kettle, and a spherical bearing coupled to the kettle, wherein the spherical bearing is coupled to a swivel end of the shaft, wherein the kettle is coupled with the linear drive such that a linear force applied by the linear drive is translated through the kettle, the spherical bearing, and the shaft to the screw to linearly move the screw within the barrel.

2. The extruder of claim 1 further comprising a drive motor having an output shaft, the drive motor is coupled to the frame, wherein the output shaft has a second longitudinal axis that is parallel to and offset from the first longitudinal axis and the drive motor capable of causing rotational movement of the screw.

3. The extruder of claim 1 further comprising a nozzle terminating the first end of the barrel and fluidly coupled with the internal cylindrical volume, wherein the nozzle has an internal surface forming a port.

4. The extruder of claim 1, wherein the shaft extends through the second end of the barrel toward the linear drive.

5. The extruder of claim 1, wherein the connection assembly further comprises a spherical bearing retention plate that is coupled with the kettle and secures the spherical bearing within a portion of the kettle, wherein the spherical bearing isolates the linear drive from rotational movement transmitted from the screw to the shaft.

6. The extruder of claim 1, wherein the connection assembly is coupled with the frame and extends from a first side of the frame and the barrel extends from an opposite second side of the frame.

7. The extruder of claim 1 further comprising a controller operably coupled with the linear drive and a drive motor, wherein the controller is capable of instructing the linear drive to cause a linear movement of the screw to retract a screw end while also capable of instructing the drive motor to cease rotation of the screw.

8. The extruder of claim 7, wherein the controller is capable of instructing the linear drive to retract the screw within the barrel at a termination of material extrusion and to extend the screw within the barrel at a start of material extrusion.

9. The extruder of claim 8, wherein the controller is operably coupled with a multi-axis robot and capable of instructing positioning of an end-of-arm tool associated with the multi-axis robot and instructing the linear drive in concert.

10. The extruder of claim 1, wherein the screw comprises a bore at the proximal end, the bore capable of receiving a screw end of a shaft and wherein the bore comprises a right-hand thread or a left-hand thread for threadably coupling the shaft with the screw.

11. The extruder of claim 10, wherein the screw further comprises a set screw extending through the screw into the bore.

12. An extruder having an adjustable pressure output, the extruder comprising:

a frame;

a barrel having an internal cylindrical volume that has a first longitudinal axis extending between a first end and a second end, the barrel is coupled to the frame;

a nozzle terminating the first end of the barrel;

a linear drive effective to adjust a position of the nozzle along the first longitudinal axis;

a screw within the internal cylindrical volume of the barrel, the screw having a distal end and a proximal end, wherein the screw is rotationally movable within the internal cylindrical volume;

a controller, wherein the controller is capable of instructing a change in volume between the distal end of the screw and the nozzle at a start or a stop of material extrusion through the nozzle; and a connection assembly positioned between a shaft and the linear drive, the connection assembly capable of isolating rotational motion to the shaft from the linear drive, wherein the connection assembly comprises a spherical bearing, the spherical bearing is effective to join the shaft with the connection assembly such that rotational motion from the shaft is capable for rotating a first portion of the spherical bearing while a second portion of the spherical bearing remains rotationally fixed.

13. The extruder of claim 12, wherein the controller is operably coupled with the linear drive and effective to instruct the linear drive to cause the change in volume.

14. The extruder of claim 12 further comprising a linear drive effective to a position of the screw along the first longitudinal axis, wherein the controller is operably coupled with the linear drive and effective to instruct the linear drive to cause the change in volume.

15. The extruder of claim 14, wherein the shaft is coaxially joined with the screw and coupled with the linear drive and capable of transferring linear force from the linear drive to the screw.

* * * * *